United States Patent
Liao

(10) Patent No.: US 12,250,364 B2
(45) Date of Patent: Mar. 11, 2025

(54) TESTING DEVICE AND TESTING METHOD FOR DETECTING STITCHING DEFECT OF PANORAMIC CAMERA

(71) Applicant: ASPEED Technology Inc., Hsinchu (TW)

(72) Inventor: Chieh-Cheng Liao, Hsinchu (TW)

(73) Assignee: ASPEED Technology Inc., Hsinchu (TW)

( * ) Notice: Subject to any disclaimer, the term of this patent is extended or adjusted under 35 U.S.C. 154(b) by 550 days.

(21) Appl. No.: 17/577,000

(22) Filed: Jan. 16, 2022

(65) Prior Publication Data
US 2023/0164306 A1      May 25, 2023

(30) Foreign Application Priority Data
Nov. 25, 2021     (TW) .................. 110143880

(51) Int. Cl.
| | | |
|---|---|---|
| *H04N 17/00* | (2006.01) | |
| *G06T 5/30* | (2006.01) | |
| *G06T 5/70* | (2024.01) | |
| *G06T 7/00* | (2017.01) | |
| *H04N 23/56* | (2023.01) | |
| *H04N 23/698* | (2023.01) | |

(52) U.S. Cl.
CPC ............ *H04N 17/002* (2013.01); *G06T 5/30* (2013.01); *G06T 5/70* (2024.01); *G06T 7/0002* (2013.01); *H04N 23/698* (2023.01); *G06T 2207/20036* (2013.01); *G06T 2207/30168* (2013.01); *H04N 23/56* (2023.01)

(58) Field of Classification Search
CPC .... H04N 17/002; H04N 23/698; H04N 23/56; G06T 5/30; G06T 5/70; G06T 7/0002; G06T 2207/20036; G06T 2207/30168; G06T 5/20; G06T 7/00; G06T 2207/10024
See application file for complete search history.

(56) References Cited

U.S. PATENT DOCUMENTS

| | | |
|---|---|---|
| 9,876,954 B2 | 1/2018 | Pettegrew et al. |
| 10,600,155 B2 | 3/2020 | Brandt et al. |

(Continued)

FOREIGN PATENT DOCUMENTS

| | | |
|---|---|---|
| CA | 2652013 | 4/2014 |
| CN | 106683045 | 5/2017 |

(Continued)

OTHER PUBLICATIONS

"Office Action of Taiwan Counterpart Application", issued on Nov. 15, 2022, p. 1-p. 4.

(Continued)

*Primary Examiner* — Farzana Hossain
(74) *Attorney, Agent, or Firm* — JCIPRNET

(57) ABSTRACT

A testing device and a testing method for detecting a stitching defect of a panoramic camera are provided. The testing method includes: accessing the panoramic camera to obtain a stitched image, wherein the stitched image includes a chart image corresponding to a chart, wherein the chart includes multiple black stripes and multiple white stripes; generating a defect image marked with the stitching defect according to the chart image; and outputting the defect image.

20 Claims, 8 Drawing Sheets

(56) References Cited

U.S. PATENT DOCUMENTS

| | | | | |
|---|---|---|---|---|
| 2015/0281507 A1* | 10/2015 | Konen | ............... | H04N 23/81 |
| | | | | 348/231.6 |
| 2016/0104285 A1* | 4/2016 | Pettegrew | ............ | G06T 5/50 |
| | | | | 348/36 |
| 2020/0268339 A1* | 8/2020 | Hao | ............ | A61B 6/032 |
| 2021/0160426 A1* | 5/2021 | Aguilar | ............ | H04N 17/002 |

FOREIGN PATENT DOCUMENTS

| | | |
|---|---|---|
| CN | 109785395 | 5/2019 |
| TW | 201839717 | 11/2018 |
| TW | 201905852 | 2/2019 |
| WO | 2017161608 | 9/2017 |

OTHER PUBLICATIONS

"Office Action of Taiwan Counterpart Application", issued on Jun. 30, 2023, p. 1-p. 9.

* cited by examiner

TESTING DEVICE AND TESTING METHOD FOR DETECTING STITCHING DEFECT OF PANORAMIC CAMERA

CROSS-REFERENCE TO RELATED APPLICATION

This application claims the priority benefit of Taiwan application serial no. 110143880, filed on Nov. 25, 2021. The entirety of the above-mentioned patent application is hereby incorporated by reference herein and made a part of this specification.

BACKGROUND

Technical Field

The disclosure relates to a testing device and a testing method for detecting a stitching defect of a panoramic camera.

Description of Related Art

Compared with traditional cameras, a panoramic camera can obtain a panoramic image that includes more information. At present, the panoramic image is gradually being applied in innovative technologies, such as virtual reality (VR), smart sightseeing, or driving assistance.

The panoramic camera can be equipped with a fisheye lens or a multi-lens. Compared with a fisheye lens camera, a multi-lens camera has advantages such as a wide angle of view and high resolution. In order to generate the panoramic image, the multi-lens camera needs to use multiple lenses to respectively obtain multiple images, and to stitch the images into the panoramic image according to an algorithm. However, during the assembly process of the multi-lens camera, problems such as abnormal calibration, casing compression, or differences within tolerances may occur, causing a stitched image generated by the camera to include a stitching defect. If the stitching defect cannot be detected before shipping the camera, the defective product will enter the market. Therefore, how to propose a method for detecting the stitching defect is one of the important topics in the art.

SUMMARY

The disclosure provides a testing device and a testing method for detecting a stitching defect of a panoramic camera, which can detect the stitching defect in a panoramic image.

A testing device for detecting a stitching defect of a panoramic camera of the disclosure includes a processor, a transceiver, and a chart. The chart includes multiple black stripes and multiple white stripes, and is configured to be captured by the panoramic camera. The transceiver is communicatively connected to the panoramic camera. The processor is coupled to the transceiver. The processor is configured to execute the following. The panoramic camera is accessed through the transceiver to obtain a stitched image corresponding to the captured chart. The stitched image includes a chart image corresponding to the chart. A defect image marked with the stitching defect is generated according to the chart image. The defect image is output through the transceiver.

In an embodiment of the disclosure, the processor is further configured to execute the following. The chart image is filtered according to a first grayscale value threshold and a second grayscale value threshold to generate the defect image.

In an embodiment of the disclosure, the first grayscale value threshold is greater than the second grayscale value threshold. The processor is further configured to execute the following. A first noise in the chart image is filtered out according to the first grayscale value threshold. A first grayscale value of the first noise is greater than the first grayscale value threshold. A second noise in the chart image is filtered out according to the second grayscale value threshold. A second grayscale value of the second noise is less than the second grayscale value threshold.

In an embodiment of the disclosure, the processor is further configured to execute the following. Morphology filtering is executed on the chart image to generate the defect image.

In an embodiment of the disclosure, the morphology filtering includes the following. A third noise in the chart image is filtered out according to an erosion operation.

In an embodiment of the disclosure, the chart image includes a striped image. The morphology filtering includes the following. A fourth noise is filtered out from the chart image. A length of the fourth noise in a first direction is greater than a pixel number threshold. The first direction is perpendicular to the striped image.

In an embodiment of the disclosure, the processor is further configured to execute the following. A pixel resolution corresponding to the panoramic camera is received through the transceiver. The pixel number threshold is determined according to the pixel resolution.

In an embodiment of the disclosure, the pixel resolution is inversely proportional to the pixel number threshold.

In an embodiment of the disclosure, the processor is further configured to execute the following. Blob detection is executed on the chart image to detect a blob on the chart image. The blob is deleted from the chart image to generate the defect image.

In an embodiment of the disclosure, the processor is further configured to execute the following. The blob is deleted according to an area of the blob.

In an embodiment of the disclosure, the processor is further configured to execute the following. The blob is deleted according to a long-to-short axis ratio of the blob.

In an embodiment of the disclosure, the processor is further configured to execute the following. The blob is deleted in response to the long-to-short axis ratio being less than a ratio threshold.

In an embodiment of the disclosure, the processor is further configured to execute the following. A defect parameter is obtained from the defect image. The defect parameter is output through the transceiver.

In an embodiment of the disclosure, the defect parameter includes at least one of a defect number, a defect area, and a defect location.

In an embodiment of the disclosure, the processor obtains the defect parameter according to at least one of an image recognition model and a machine learning model.

In an embodiment of the disclosure, the processor is further configured to execute the following. The chart image is extracted from the stitched image according to a region of interest.

In an embodiment of the disclosure, the black stripes include a first black stripe and a second black stripe. The white stripes include a first white stripe. The first white stripe is between the first black stripe and the second black stripe.

The first white stripe, the first black stripe, and the second black stripe are parallel to one another.

In an embodiment of the disclosure, the chart further includes an alignment stripe. The alignment stripe is not parallel to the first white stripe.

In an embodiment of the disclosure, the testing device further includes a fixing member. The fixing member fixes the panoramic camera, so that the stitched image includes the chart image.

In an embodiment of the disclosure, the testing device further includes a light source. The light source projects light onto the chart.

A testing method for detecting a stitching defect of a panoramic camera of the disclosure includes the following steps. The panoramic camera is accessed to obtain a stitched image corresponding to a chart. The stitched image includes a chart image corresponding to the chart. The chart includes multiple black stripes and multiple white stripes. A defect image marked with the stitching defect is generated according to the chart image. The defect image is output.

Based on the above, the testing device of the disclosure may mark the stitching defect in the chart image for the reference of the user. The testing device may also provide parameters including a defect number, a defect area, or a defect location for the reference of the user. Therefore, in this way, the technician on the production line of the panoramic camera may quickly judge whether the produced panoramic camera is defective based on an output image of the testing device.

DETAILED DESCRIPTION OF DISCLOSED EMBODIMENTS

Figure 1:
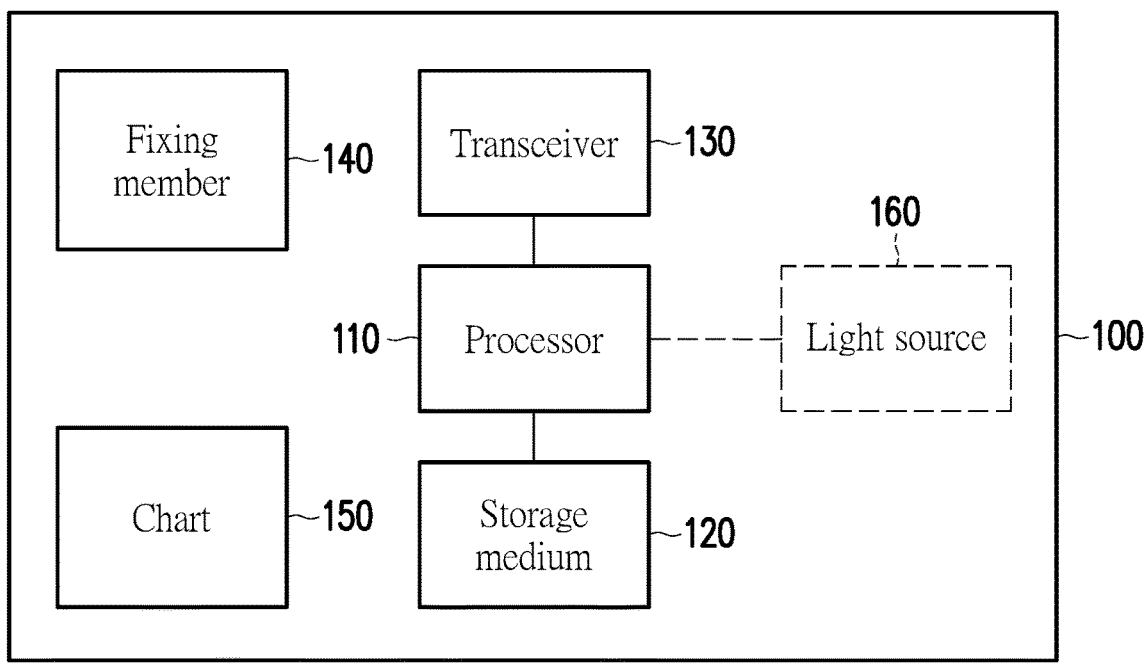
FIG. 1 is a schematic diagram of a testing device for detecting a stitching defect of a panoramic camera according to an embodiment of the disclosure.

FIG. 1 is a schematic diagram of a testing device 100 for detecting a stitching defect of a panoramic camera according to an embodiment of the disclosure, wherein the panoramic camera may include a multi-lens camera with a wide viewing angle. The testing device 100 may include a processor 110, a storage medium 120, a transceiver 130, a fixing member 140, and a chart 150. In an embodiment, the testing device 100 may further include a light source 160.

The processor 110 is, for example, a central processing unit (CPU), or other programmable general-purpose or specific-purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA), other similar elements, or a combinations of the above elements. The processor 110 may be coupled to the storage medium 120 and the transceiver 130, and access and execute multiple modules and various applications stored in the storage medium 120.

The storage medium 120 can be, for example, any type of fixed or removable random access memory (RAM), read-only memory (ROM), flash memory, hard disk drive (HDD), solid state drive (SSD), similar elements, or a combination of the above elements, and is configured to store multiple modules or various applications that may be executed by the processor 110.

The transceiver 130 transmits and receives signals in a wireless or wired manner. The transceiver 130 may also execute operations such as low noise amplification, impedance matching, frequency mixing, up or down frequency conversion, filtering, and amplification.

The fixing member 140 may be configured to fix the panoramic camera or the chart 150, so that a stitched image captured by the panoramic camera includes a chart image corresponding to the chart 150. When the chart 150 is captured in a panoramic image, the chart 150 may emit light. In an embodiment, the chart 150 may include a backlight panel. The chart 150 may self-emit light through the backlight panel. In an embodiment, the light source 160 may project light onto the chart 150, so that the chart 150 emits light.

Figure 2A:
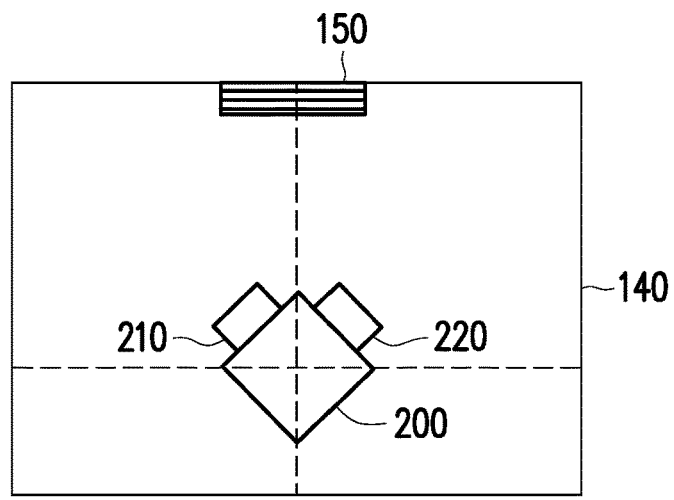
FIG. 2A, FIG. 2B, and FIG. 2C are schematic diagrams of configurations of a panoramic camera and a chart according to an embodiment of the disclosure.
Figure 2A:
Figure 2B:
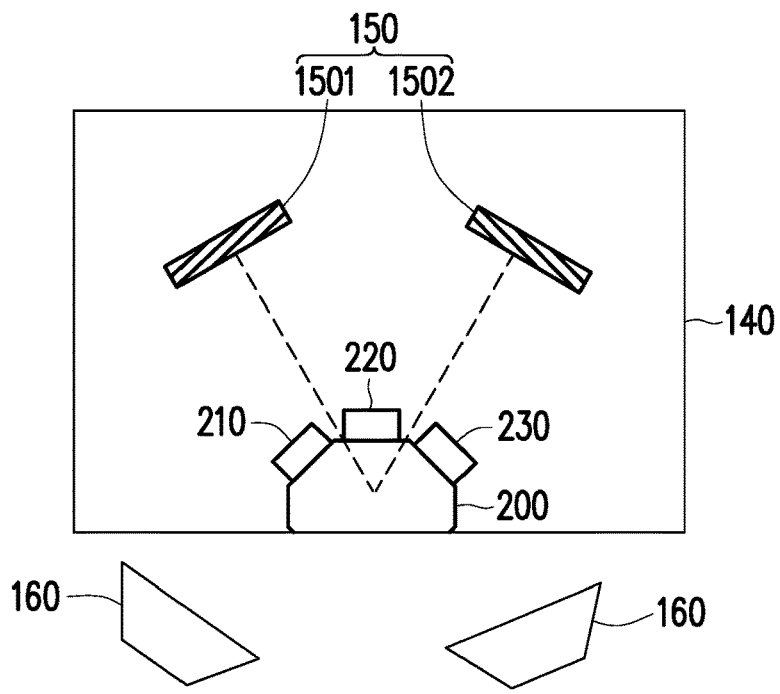
Figure 2C:
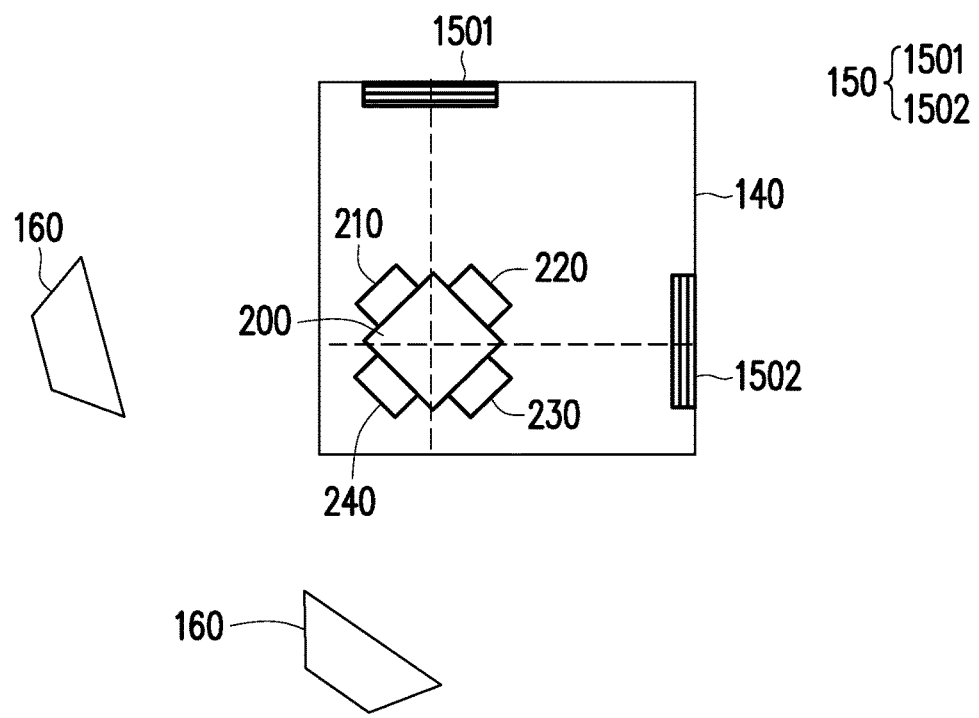

FIG. 2A, FIG. 2B, and FIG. 2C are schematic diagrams of configurations of a panoramic camera 200 and the chart 150 according to an embodiment of the disclosure. Referring to FIG. 2A, in the embodiment, the panoramic camera 200 may include a lens 210 and a lens 220. The panoramic camera 200 and the chart 150 may be disposed on the surface of the fixing member 140, so that the chart 150 is located at an overlap of a viewing angle of the lens 210 and a viewing angle of the lens 220. In this way, when the panoramic camera 200 captures the chart 150 through the lens 210 and the lens 220 and generates a stitched image, a stitched region, that is, a region of interest (ROI) in the stitched image may include a chart image corresponding to the chart 150. The testing device 100 may extract the chart image corresponding to the chart 150 from the stitched image according to the region of interest. The testing device 100 may detect whether there is a stitching defect in the stitched region corresponding to the lens 210 and the lens 220 according to the chart image corresponding to the chart 150.

Referring to FIG. 2B, in the embodiment, the panoramic camera 200 may include the lens 210, the lens 220, and a lens 230, and the chart 150 may include a chart 1501 and a chart 1502. The panoramic camera 200, the chart 1501, and the chart 1502 may be disposed on the surface of the fixing member 140, so that the chart 1501 is located at the overlap of the viewing angle of the lens 210 and the viewing angle of the lens 220, and the chart 1502 is located at an overlap of the viewing angle of the lens 220 and a viewing angle of the lens 230. In this way, when the panoramic camera 200 captures a stitched image through the lens 210, the lens 220, and the lens 230, a region of interest in the stitched image may include a chart image corresponding to the chart 1501, and another region of interest in the stitched image may include a chart image corresponding to the chart 1502. The testing device 100 may detect whether there is a stitching defect in the stitched image corresponding to the lens 210 and the lens 220 according to the chart image corresponding to the chart 1501, and may detect whether there is a stitching defect in the stitched image corresponding to the lens 220 and the lens 230 according to the chart image corresponding to the chart 1502.

Referring to FIG. 2C, in this embodiment, the panoramic camera 200 may include the lens 210, the lens 220, the lens 230, and a lens 240, and the chart 150 may include the chart 1501 and the chart 1502. The panoramic camera 200, the chart 1501, and the chart 1502 may be disposed on the surface of the fixing member 140, so that the chart 1501 is located at the overlap of the viewing angle of the lens 210 and the viewing angle of the lens 220, and the chart 1502 is located at the overlap of the viewing angle of the lens 220 and the viewing angle of the lens 230. In this way, when the panoramic camera 200 captures a stitched image through the lens 210, the lens 220, and the lens 230, a region of interest in the stitched image may include a chart image corresponding to the chart 1501, and another region of interest in the stitched image may include a chart image corresponding to the chart 1502. The testing device 100 may detect whether there is a stitching defect in the stitched image corresponding to the lens 210 and the lens 220 according to the chart image corresponding to the chart 1501, and may detect whether there is a stitching defect in the stitched image corresponding to the lens 220 and the lens 230 according to the chart image corresponding to the chart 1502.

Then, the user may reset the panoramic camera 200 (for example, rotate the panoramic camera 200 clockwise by 180 degrees), so that the chart 1501 is located at an overlap of the viewing angle of the lens 230 and a viewing angle of the lens 240, and the chart 1502 is located at an overlap of the viewing angle of the lens 240 and the viewing angle of the lens 210. In this way, when the panoramic camera 200 captures a stitched image through the lens 210, the lens 230, and the lens 240, a region of interest in the stitched image may include a chart image corresponding to the chart 1501, and another region of interest in the stitched image may include a chart image corresponding to the chart 1502. The testing device 100 may detect whether there is a stitching defect in the stitched image corresponding to the lens 230 and the lens 240 according to the chart image corresponding to the chart 1501, and may detect whether there is a stitching defect in the stitched image corresponding to the lens 240 and the lens 210 according to the chart image corresponding to the chart 1502. In this way, the user can complete a testing process of the panoramic camera 200 with multiple lenses in a shorter time.

Please refer to FIG. 1 and FIG. 2A to FIG. 2C at the same time. The transceiver 130 of the testing device 100 may be communicatively connected to the panoramic camera 200. The processor 110 may access the panoramic camera 200 through the transceiver 130 to obtain a stitched image generated by the panoramic camera 200 capturing the chart 150. The stitched image may include a chart image corresponding to the chart 150.

Figure 3A:
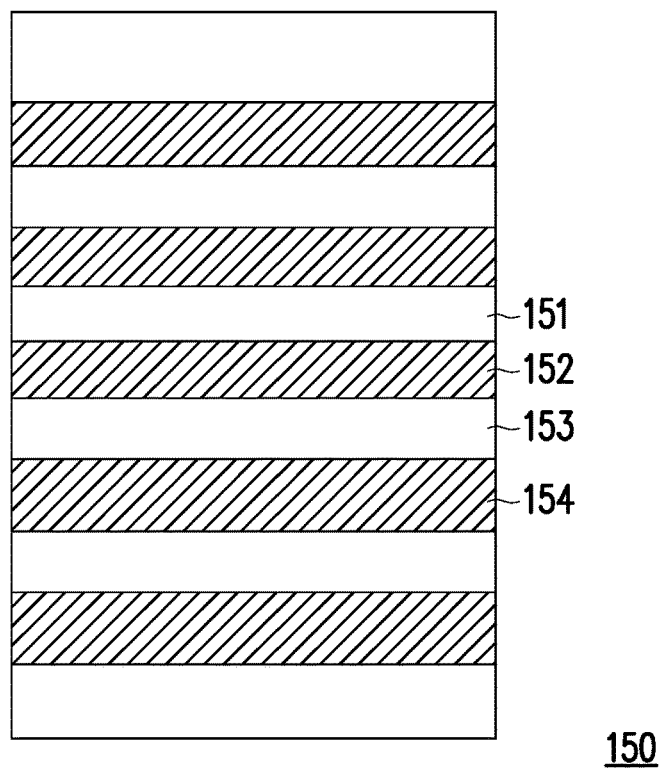
FIG. 3A is a schematic diagram of a chart according to an embodiment of the disclosure.

FIG. 3A is a schematic diagram of a chart 150 according to an embodiment of the disclosure. The chart 150 may include multiple black stripes and multiple white stripes. For example, the chart 150 may include a white stripe 151, a black stripe 152, a white stripe 153, and a black stripe 154. The black stripe 152 may be between the white stripe 151 and the white stripe 153. The white stripe 151, the black stripe 152, and the white stripe 153 may be parallel to one another. The white stripe 153 may be between the black stripe 152 and the black stripe 154. The black stripe 152, the white stripe 153, and the black stripe 154 may be parallel to one another.

Figure 3B:
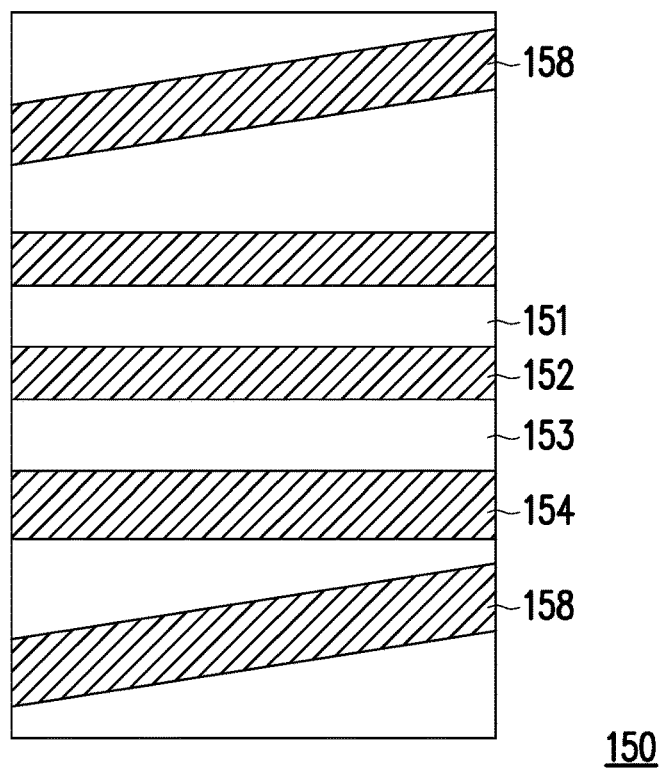
FIG. 3B is a schematic diagram of a chart according to another embodiment of the disclosure.

FIG. 3B is a schematic diagram of a chart 150 according to another embodiment of the disclosure. In an embodiment, the chart 150 may further include an alignment stripe 158. The alignment stripe 158 may not be parallel to the white stripe 151, the black stripe 152, the white stripe 153, or the black stripe 154. The processor 110 may align the chart 150 according to the alignment stripe 158. For example, multiple horizontal stripes (for example, black stripes or white stripes) of the chart 150 may be interspersed with the slanted alignment stripe 158. The processor 110 may judge whether the stitching of the chart 150 is normal according to the alignment stripe 158 to avoid mistaking the stitching defect of "up-and-down misalignment of exactly one stripe interval" as normal.

Figure 4A:
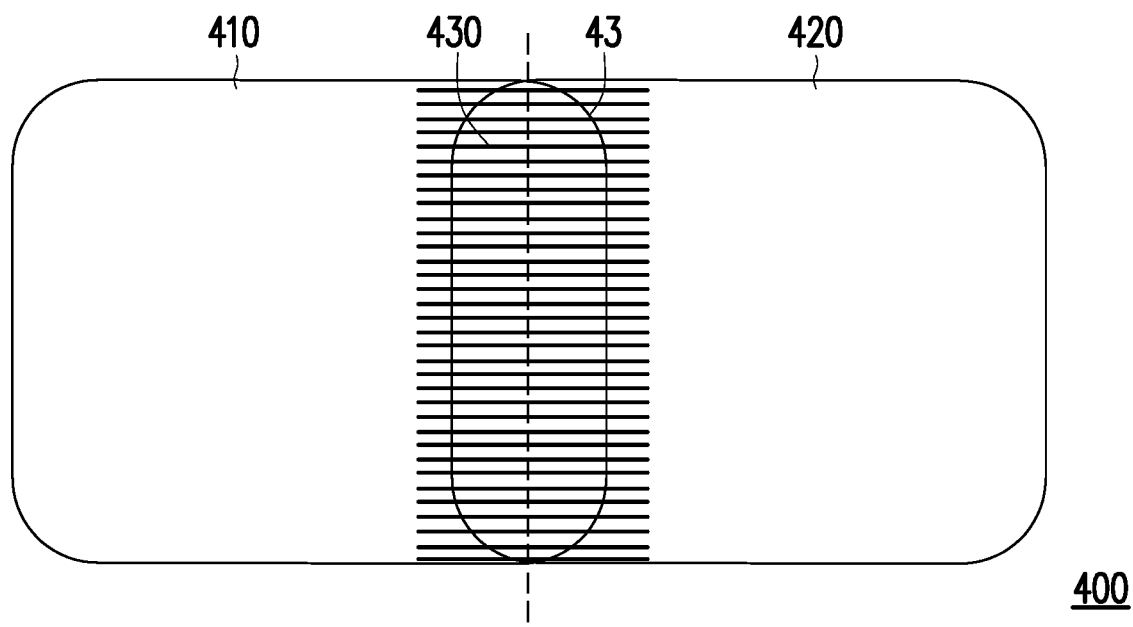
FIG. 4A is a schematic diagram of a stitched image without a stitching defect according to an embodiment of the disclosure.

FIG. 4A is a schematic diagram of a stitched image 400 without a stitching defect according to an embodiment of the disclosure. After respectively obtaining two images through the lens 210 and the lens 220, the processor 110 may perform alpha blending on the two images to stitch the two images and generate a stitched image 400. Specifically, the two images respectively obtained by the lens 210 and the lens 220 may partially overlap. In order to smooth the overlap, the processor 110 may first transparentize the two images, and then blend the two images according to Equation (1) to generate the stitched image 400, where RGB1 may represent a pixel in the overlap corresponding to the image obtained by the lens 210, RGB2 may represent a pixel in the overlap corresponding to the image obtained by the lens 220, and RGB3 may represent a pixel in the stitched image 400. The stitched image 400 may include a region 410 corresponding to the viewing angle of the lens 210 and a region 420 corresponding to the viewing angle of the lens 220. A region of interest 43 may be located at an overlap (that is, a stitched region) of the region 410 and the region 420. The region of interest 43 may include a chart image 430 corresponding to the chart 150. If the chart image 430 does not include a stitching defect, the grayscale value of the chart image 430 may be as shown in FIG. 4B.

$$RGB3=(1-a)*RGB1+a*RGB2 \qquad (1)$$

Figure 4B:
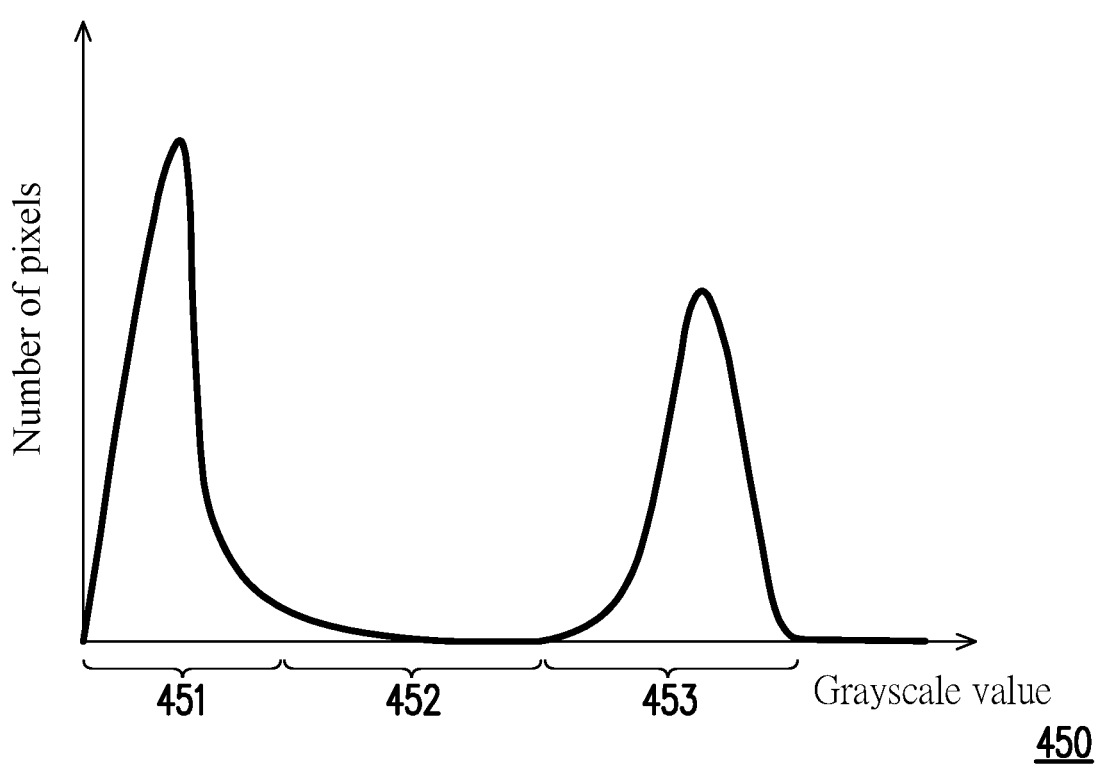
FIG. 4B is a grayscale histogram of a chart image of FIG. 4A according to an embodiment of the disclosure.

FIG. 4B is a grayscale histogram 450 of the chart image 430 of FIG. 4A according to an embodiment of the disclosure. The grayscale histogram 450 may include a grayscale value region 451 representing a white pixel, a grayscale value region 452 representing a gray pixel, and a grayscale value region 453 representing a black pixel. It can be seen from FIG. 4B that since the chart image 430 does not include a stitching defect, when the processor 110 performs the alpha blending on the two images, black stripes and white stripes are not blended together. Therefore, the number of pixels in the grayscale value region 452 is very small.

Figure 5A:
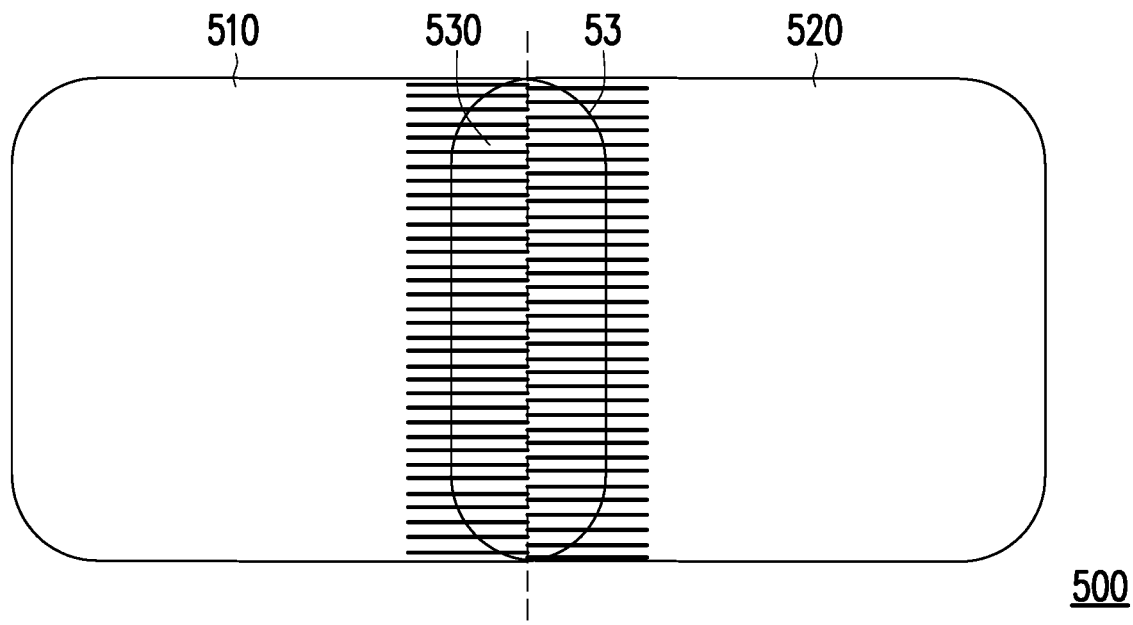
FIG. 5A is a schematic diagram of a stitched image including a stitching defect according to an embodiment of the disclosure.

FIG. 5A is a schematic diagram of a stitched image 500 including a stitching defect according to an embodiment of the disclosure. After respectively obtaining two images through the lens 210 and the lens 220, the processor 110 may perform the alpha blending on the two images to stitch the two images and generate a stitched image 500. The stitched image 500 may include a region 510 corresponding to the viewing angle of the lens 210 and a region 520 corresponding to the viewing angle of the lens 220. A region of interest 53 may be located at an overlap (that is, a stitched region) of the region 510 and the region 520. The region of interest 53 may include a chart image 530 corresponding to the chart 150. If the chart image 530 includes a stitching defect, the grayscale value of the chart image 530 may be as shown in FIG. 5B.

Figure 5B:
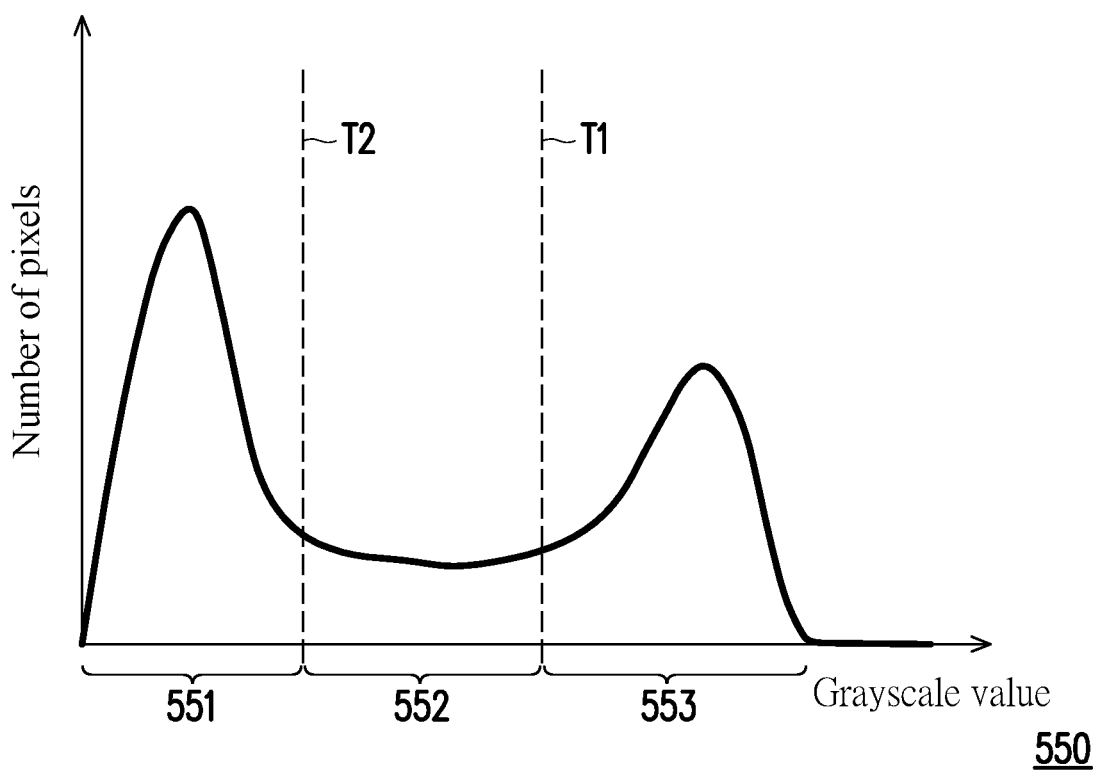
FIG. 5B is a grayscale histogram of a chart image of FIG. 5A according to an embodiment of the disclosure.

FIG. 5B is a grayscale histogram 550 of the chart image 530 of FIG. 5A according to an embodiment of the disclosure. The grayscale histogram 550 may include a grayscale value region 551 representing a white pixel, a grayscale value region 552 representing a gray pixel, and a grayscale value region 553 representing a black pixel. It can be seen from FIG. 5B that since the chart image 530 includes a stitching defect, when the processor 110 performs the alpha blending on the two images, black stripes and white stripes are blended together. Therefore, compared with the grayscale value region 452 shown in FIG. 4B, the number of pixels in the grayscale value region 552 is very large.

Figure 6A:
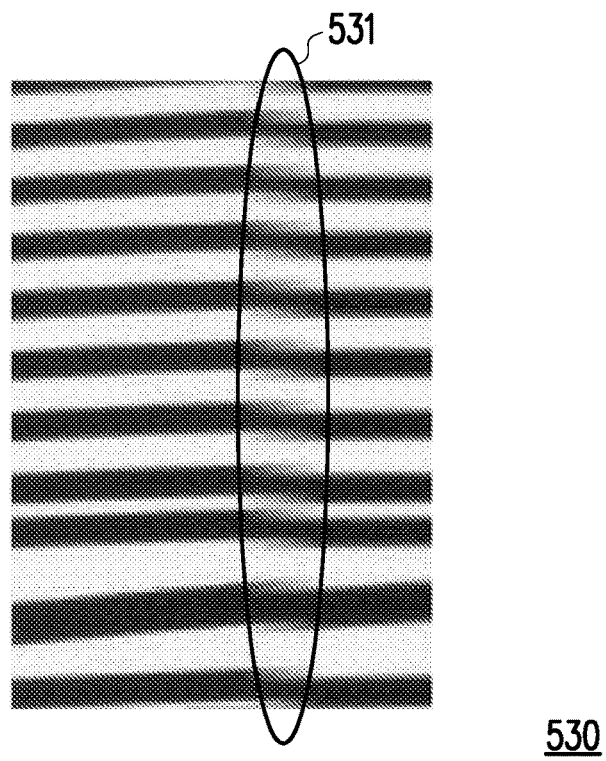
FIG. 6A is a schematic diagram of an enlarged chart image according to an embodiment of the disclosure.
Figure 6B:
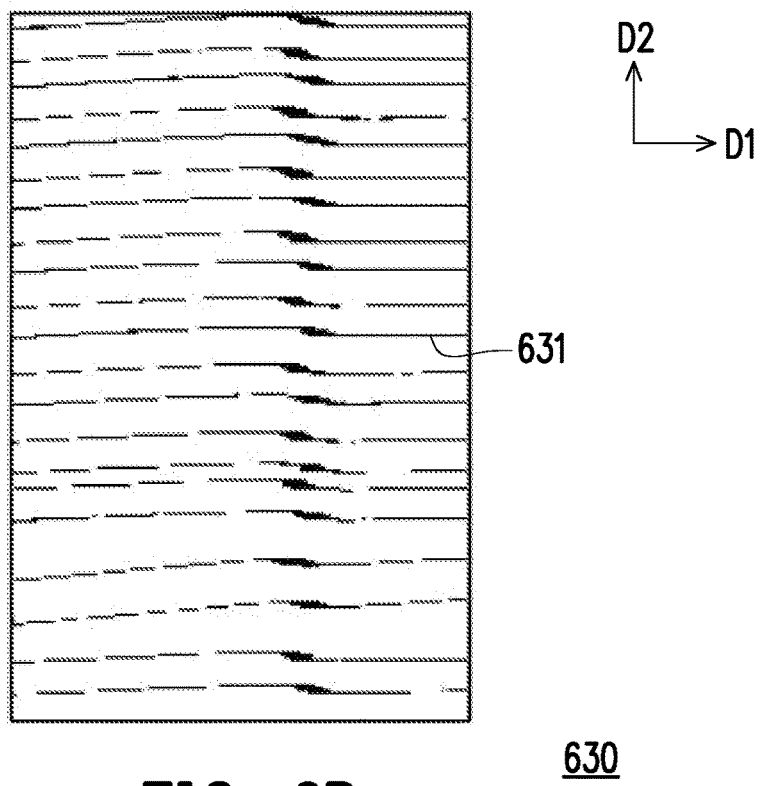
FIG. 6B, FIG. 6C, FIG. 6D, and FIG. 6E are schematic diagrams of filtered chart images according to an embodiment of the disclosure.

FIG. 6A is a schematic diagram of an enlarged chart image 530 according to an embodiment of the disclosure. The chart image 530 may include black stripes and white stripes. The stitching defect in the chart image 530 is located in a circled region 531. Compared with other regions of the chart image 530, which are mostly represented by black pixels or white pixels, the region 531 includes more gray pixels. In order for the stitching defect to be more obvious, the processor 110 may filter out the noise of the chart image 530 according to a grayscale value threshold T1 and a grayscale value threshold T2, thereby generating a chart image 630 as shown in FIG. 6B.

Specifically, the storage medium 120 may pre-store the grayscale value threshold T1 and the grayscale value threshold T2, wherein the grayscale value threshold T1 may be greater than the grayscale value threshold T2. The grayscale value threshold T1 and the grayscale value threshold T2 are related to environmental conditions such as light source brightness and charts. Under the premise of constant environmental conditions, the processor 110 may filter out the noise in the chart image 530 according to the grayscale value threshold T1, wherein the grayscale value of the noise is greater than the grayscale value threshold T1. For example, the noise with a grayscale value greater than the grayscale value threshold T1 may include white stripes that do not include a stitching defect. On the other hand, the processor 110 may filter out the noise in the chart image 530 according to the grayscale value threshold T2, wherein the grayscale value of the noise is less than the grayscale value threshold T2. For example, the noise with a grayscale value less than the grayscale value threshold T2 may include black stripes that do not include a stitching defect. In this way, the processor 110 may filter out the black stripes or the white stripes in the chart image 530 according to the grayscale value thresholds T1 and T2.

FIG. 6B, FIG. 6C, FIG. 6D, and FIG. 6E are schematic diagrams of filtered chart images according to an embodiment of the disclosure. After the processor 110 filters out the noise of the chart image 530 according to the grayscale value threshold T1 and the grayscale value threshold T2 to generate the chart image 630, the chart image 630 may include a striped noise 631 that is approximately parallel to a direction D1 of a striped image in the chart image 630 (for example, the white stripe 151 or the black stripe 152 as shown in FIG. 3A).

The processor 110 may execute morphology filtering on the chart image 630 to generate a filtered chart image 730. Specifically, the processor 110 may filter out the noise 631 from the chart image 630 in response to the length of the noise 631 on the chart image 630 in a direction D2 being greater than a pixel number threshold, wherein the direction D2 is perpendicular to the direction D1. For example, the pixel number threshold may be 2. If the length of the noise 631 in the direction D2 is greater than 2 pixels, the processor 110 may regard the noise 631 as a striped noise. Accordingly, the processor 110 may filter out the noise 631 from the chart image 630.

One or more pixel number thresholds may be pre-stored in the storage medium 120. In an embodiment, the pixel number threshold may be related to the pixel resolution of the panoramic camera 200. The processor 110 may receive the pixel resolution corresponding to the panoramic camera 200 through the transceiver 130, and determine the pixel number threshold according to the pixel resolution. When two images are stitched or alpha blended, a stitched image generated by an image with higher resolution will have narrower striped noise. Therefore, the pixel number threshold may be inversely proportional to the pixel resolution. The processor 110 may select a pixel number threshold suitable for the panoramic camera 200 from the storage medium 120 according to the pixel resolution.

Figure 6C:
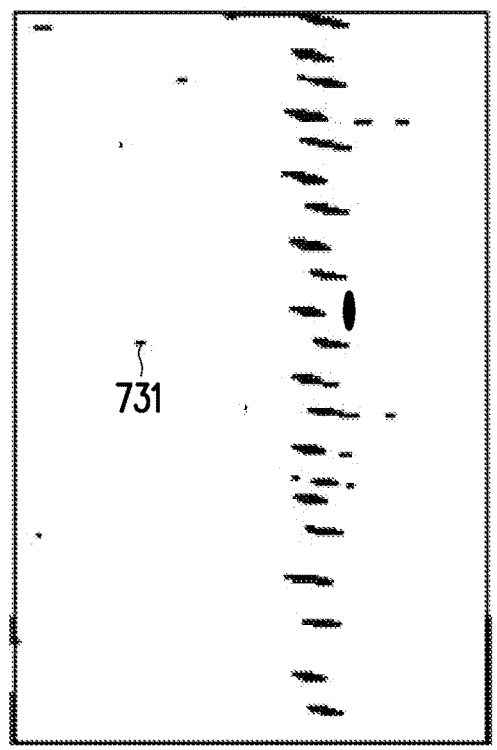

As shown in FIG. 6C, the chart image 730 may include a small-area noise 731. The noise 731 may be referred to as pepper and salt noise (sparsely occurring small-area white and black pixels). The processor 110 may execute morphology filtering on the chart image 730 to generate a filtered chart image 830. The processor 110 may perform an open computation on the chart image 730 to filter out the noise 731 in the chart image 730. Specifically, the processor 110 may first execute an erosion operation on the chart image 730, and then execute a dilation operation on the chart image 730 to filter out the noise 731 in the chart image 730 to generate the chart image 830. The open computation may smooth contours of objects in the chart image 730, filter out the salt and pepper noise in the chart image 730, and eliminate narrow thin lines. In other words, the open computation may disconnect small connections between objects, so that two objects may be clearly distinguished.

Figure 6D:
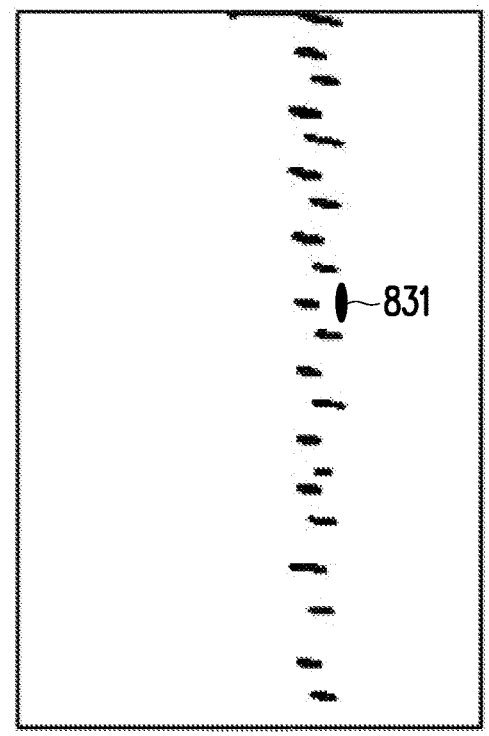

As shown in FIG. 6D, the chart image 830 may include a blob-type noise 831. The processor 110 may execute blob detection on the chart image 830 to detect a blob (that is, the noise 831) on the chart image 830. Then, the processor 110 may delete the blob from the chart image 830 to generate a filtered chart image 930. In an embodiment, the processor 110 may determine whether to delete the blob according to a long-to-short axis ratio of the blob. For example, the noise 831 is assumed to be an elliptical blob. The long-to-short axis ratio is a ratio of a long axis of the ellipse to a short axis of the ellipse. The processor 110 may delete the noise 831 in response to the long-to-short axis ratio of the noise 831 being less than a ratio threshold. The ratio threshold may be pre-stored in the storage medium 120.

Figure 6E:
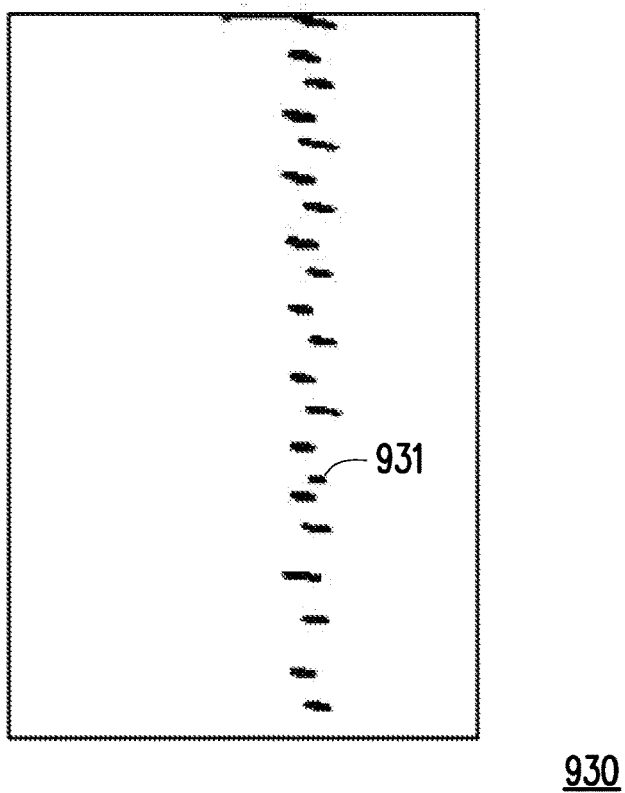

As shown in FIG. 6E, the chart image 930 may include a blob-type noise 931. The processor 110 may execute the blob detection on the chart image 930 (or the chart image 830) to detect a blob (that is, the noise 931) on the chart image 930. Then, the processor 110 may delete the blob from the chart image 930. In an embodiment, the processor 110 may determine whether to delete the blob according to an area of the blob. For example, the processor 110 may delete the noise 931 from the chart image 930 in response to an area of the noise 931 being greater than an area threshold.

The area threshold may be pre-stored in the storage medium 120. In an embodiment, the area threshold may be related to a height of a horizontal stripe on the chart 150. After completing the erosion operation, since a defect that is higher than the height of the horizontal stripe generated by the alpha blending has been filtered out, a height of a defect that has not been filtered out is not higher than the height of the horizontal stripe. Therefore, the processor 110 may set the area threshold according to the height of the horizontal stripe of the chart 150, wherein the area threshold may be proportional to the height of the horizontal stripe. In an embodiment, the area threshold may be related to a width of a stitching formed by the alpha blending, wherein the area threshold may be proportional to the width of the stitching. Since the width of the stitching is an internal parameter of the panoramic camera 200, the processor 110 may generate the area threshold according to specifications of the panoramic camera 200 in advance, and store the area threshold in the storage medium 120.

It should be noted that the disclosure does not limit the execution sequence of the filtering processes disclosed in the relevant paragraphs of FIG. 6A to FIG. 6E. For example, the processor 110 may first execute the erosion operation disclosed in the embodiment of FIG. 6C on the chart image, and then execute the filtering process based on the pixel number threshold disclosed in the embodiment of FIG. 6B on the chart image. After executing the various filtering processes, the noise on the chart image may be filtered out. Therefore, graphics displayed on the filtered chart image is the location of the stitching defect. The processor 110 may generate a defect image marked with the stitching defect according to the filtered chart image, and may output the defect image through the transceiver 130 for the reference of the user. The user may quickly judge the location of the stitching defect of the panoramic camera 200 according to the defect image.

The processor 110 may further obtain a defect parameter according to the defect image, and output the defect parameter through the transceiver 130 for the reference of the user. The defect parameter may include information such as a defect number, a defect area, or a defect location, but the disclosure is not limited thereto. For example, the processor 110 may input the defect image to an image recognition model or a machine learning model to generate the defect parameter.

Figure 7:
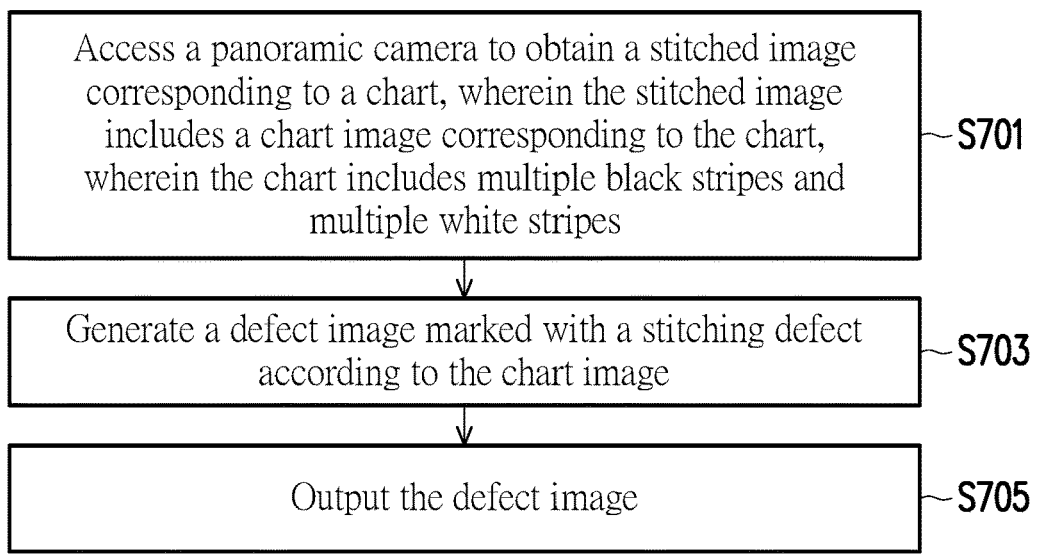
FIG. 7 is a flowchart of a testing method for detecting a stitching defect of a panoramic camera according to an embodiment of the disclosure.

FIG. 7 is a flowchart of a testing method for detecting a stitching defect of a panoramic camera according to an embodiment of the disclosure, wherein the testing method may be implemented by the testing device 100 shown in FIG. 1. In Step S701, a panoramic camera is accessed to obtain a stitched image, wherein the stitched image includes a chart image corresponding to a chart, wherein the chart includes multiple black stripes and multiple white stripes. In Step S703, a defect image marked with a stitching defect is generated according to the chart image. In Step S705, the defect image is outputted.

In summary, the testing device of the disclosure may provide the special chart for the panoramic camera to be tested to generate the chart image. The testing device may filter out various noises in the chart image through manners such as grayscale value threshold configuration, morphology filtering, pixel number threshold configuration, blob detection, or ratio threshold configuration. If the filtered chart image still has noise, it means that the chart image includes the stitching defect. The testing device may mark the stitching defect in the chart image for the reference of the user. In addition, the testing device may also provide parameters including a defect number, a defect area, or a defect location for the reference of the user.

What is claimed is:

1. A testing device for detecting a stitching defect of a panoramic camera, comprising:
   a chart, comprising a plurality of black stripes and a plurality of white stripes, and configured to be captured by the panoramic camera;
   a transceiver, communicatively connected to the panoramic camera; and
   a processor, coupled to the transceiver, wherein the processor is configured to:
   access the panoramic camera through the transceiver to obtain a stitched image corresponding to the captured chart, wherein the stitched image comprises a chart image corresponding to the chart;
   generate a defect image marked with the stitching defect according to the chart image;
   output the defect image through the transceiver;
   obtain a defect parameter according to the defect image; and
   output the defect parameter through the transceiver.

2. The testing device according to claim 1, wherein the processor is further configured to:
   filter the chart image according to a first grayscale value threshold and a second grayscale value threshold to generate the defect image.

3. The testing device according to claim 2, wherein the first grayscale value threshold is greater than the second grayscale value threshold, wherein the processor is further configured to:
   filter out a first noise in the chart image according to the first grayscale value threshold, wherein a first grayscale value of the first noise is greater than the first grayscale value threshold; and
   filter out a second noise in the chart image according to the second grayscale value threshold, wherein a second grayscale value of the second noise is less than the second grayscale value threshold.

4. The testing device according to claim 1, wherein the processor is further configured to:
   execute morphology filtering on the chart image to generate the defect image.

5. The testing device according to claim 4, wherein the morphology filtering comprises:
   filtering out a third noise in the chart image according to an erosion operation.

6. The testing device according to claim 4, wherein the chart image comprises a striped image, wherein the morphology filtering comprises:
   filtering out a fourth noise from the chart image, wherein a length of the fourth noise in a first direction is greater than a pixel number threshold, wherein the first direction is perpendicular to the striped image.

7. The testing device according to claim 6, wherein the processor is further configured to:
   receive a pixel resolution corresponding to the panoramic camera through the transceiver; and
   determine the pixel number threshold according to the pixel resolution.

8. The testing device according to claim 7, wherein the pixel resolution is inversely proportional to the pixel number threshold.

9. The testing device according to claim 1, wherein the processor is further configured to:

execute blob detection on the chart image to detect a blob on the chart image; and delete the blob from the chart image to generate the defect image.

10. The testing device according to claim 9, wherein the processor is further configured to:

delete the blob according to an area of the blob.

11. The testing device according to claim 9, wherein the processor is further configured to:

delete the blob according to a long-to-short axis ratio of the blob.

12. The testing device according to claim 11, wherein the processor is further configured to:

delete the blob in response to the long-to-short axis ratio being less than a ratio threshold.

13. The testing device according to claim 1, wherein the defect parameter comprises at least one of:

a defect number, a defect area, and a defect location.

14. The testing device according to claim 1, wherein the processor obtains the defect parameter according to at least one of:

an image recognition model and a machine learning model.

15. The testing device according to claim 1, wherein the processor is further configured to:

extract the chart image from the stitched image according to a region of interest.

16. The testing device according to claim 1, wherein the black stripes comprise a first black stripe and a second black stripe, and the white stripes comprise a first white stripe, wherein the first white stripe is between the first black stripe and the second black stripe, and the first white stripe, the first black stripe, and the second black stripe are parallel to one another.

17. The testing device according to claim 16, wherein the chart further comprises an alignment stripe, wherein the alignment stripe is not parallel to the first white stripe.

18. The testing device according to claim 1, further comprising:

a fixing member, fixing the panoramic camera, so that the stitched image comprises the chart image.

19. The testing device according to claim 1, further comprising:

a light source, projecting light onto the chart.

20. A testing method for detecting a stitching defect of a panoramic camera, comprising:

accessing the panoramic camera to obtain a stitched image corresponding to a chart, wherein the stitched image comprises a chart image corresponding to the chart, wherein the chart comprises a plurality of black stripes and a plurality of white stripes;

generating a defect image marked with the stitching defect according to the chart image;

outputting the defect image;

obtaining a defect parameter according to the defect image; and outputting the defect parameter.

* * * * *